FIP8102 XR 3,414,687

Dec. 3, 1968 W. HERMES ET AL 3,414,687

TRANSMISSION SYSTEM HAVING A PLURALITY OF SEPARATE PARALLEL TRANSMISSION LINES AND COMMON CONTROL OF INTERMEDIATE REPEATER STATIONS IN THE TRANSMISSION LINES

Filed Feb. 10, 1965 3 Sheets-Sheet 1

INVENTOR.
WILLEM HERMES
JAN VERHAGEN
BY
Frank R. Trifari
AGENT

INVENTOR.
WILLEM HERMES
JAN VERHAGEN
BY
Frank R Trifari
AGENT

Dec. 3, 1968 W. HERMES ET AL 3,414,687

TRANSMISSION SYSTEM HAVING A PLURALITY OF SEPARATE PARALLEL TRANSMISSION LINES AND COMMON CONTROL OF INTERMEDIATE REPEATER STATIONS IN THE TRANSMISSION LINES

Filed Feb. 10, 1965 3 Sheets-Sheet 3

INVENTOR.
WILLEM HERMES
JAN VERHAGEN
BY
Frank R. Trifari
AGENT

United States Patent Office 3,414,687
Patented Dec. 3, 1968

3,414,687

TRANSMISSION SYSTEM HAVING A PLURALITY OF SEPARATE PARALLEL TRANSMISSION LINES AND COMMON CONTROL OF INTERMEDIATE REPEATER STATIONS IN THE TRANSMISSION LINES

Willem Hermes and Jan Verhagen, Hilversum, Netherlands, assignors to North American Philips Company, Inc., New York, N.Y., a corporation of Delaware Filed Feb. 10, 1965, Ser. No. 431,535
Claims priority, application Netherlands, Feb. 12, 1964, 6401184
12 Claims. (Cl. 179—170)

ABSTRACT OF THE DISCLOSURE

A signal transmission system of the type in which a plurality of transmitting stations are interconnected to a plurality of final stations by way of separate parallel transmission lines including at least one repeater station having an adjustable level control. Pilot signals transmitted by the transmitting stations are separated in the corresponding final stations to produce separate control signals, and these control signals are combined to produce an average control signal for controlling, in common, all intermediate repeaters having adjustable level controls. Level control devices in the final stations are controlled only by their respective separate control signals.

This invention relates to communication systems for the transmission of signals through a plurality of parallel transmission lines in which the transmission of signals in each transmission line takes place through one or more repeater stations to a final station, at least one repeater station and also the final station in each transmission line including a level-conrol device having an adjustable level-control impedance to be controlled by a level-control signal, which impedances are controlled in magnitude by pilot signals also transmitted through the various transmission lines. More particularly the parallel transmission lines are located within a transmission cable.

In order to satisfy the very high requirements on the quality of the transmission in such communication systems, the repeater stations provided with level-control devices have to ensure that the deviations in level of the transmitted signals caused substantially by variations in damping of the transmission lines lie within two limiting values in the various transmission lines. More particularly if the signal level in the repeater stations is unduly high there is a risk of intermodulation and excess control and, if the signal level is unduly low, the influence of noise voltages is increased.

Thus, especially in the signal transmission through a large number of transmission lines over large distances, for example, several hundreds of kilometres, use is made of a large number of repeater stations including level controls in order to fulfill the requirements imposed, so that the level control requires the use of a very large number of components, whilst furthermore an instable output level occurs in the output circuit of the final station (so-called jittering) due to the interaction of the control equipments of the repeater stations in each transmission line. In fact, the level control in a repeater station usually influences the level-control devices of the succeeding repeater stations in the same transmission line, resulting in an instable output level in the relevant final station.

An object of the invention is to provide another conception of a communication system of the kind mentioned in the preamble in which a stable output level of the final station is obtained together with a considerable simplification and saving in components.

The communication system according to the invention is characterized in that the adjustable level-control impedances in the level-control devices of the repeater stations preceding the final stations are controlled collectively in the various transmission lines by the output signal from an averaging device to the input terminals of which at least a plurality of the output circuits of pilot receivers included in the final stations in the various transmisson lines are connected, whilst the final stations include adjustable level-control impedances serving for level control which are controlled individually by the pilot receivers associated with the final stations.

In order that the invention may be readily carried into effect, it will now be described in detail, by way of example, with reference to the accompanying diagrammatic drawings, in which:

FIGURE 1 shows a communication system of known type;

FIGURE 2 an associated level diagram;

Figure 4:
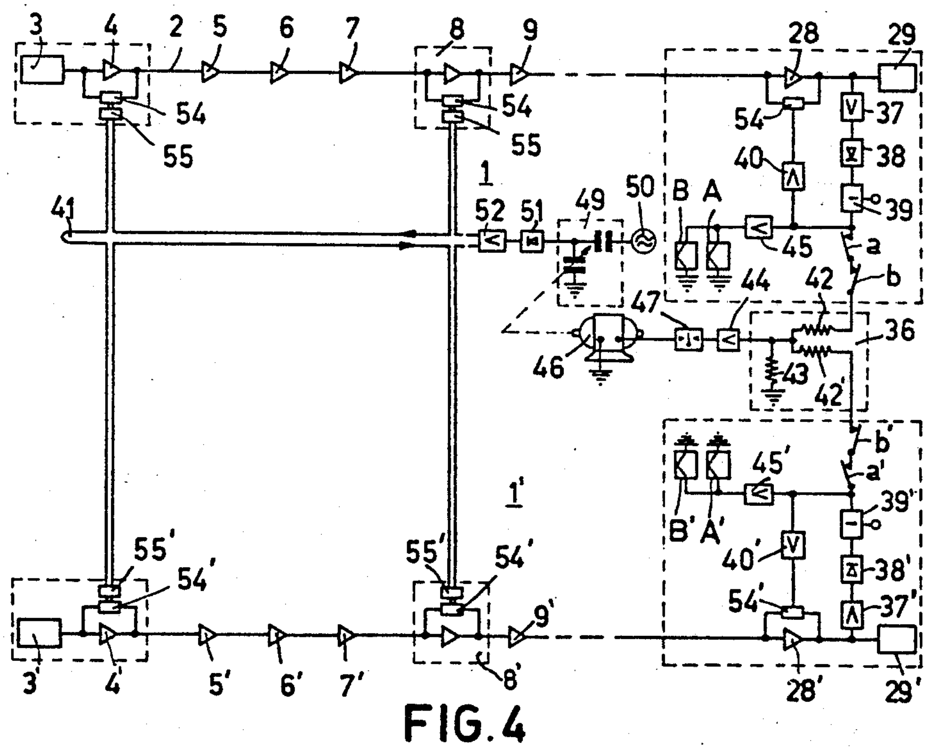
FIGURE 4 shows avery advantageous embodiment of a communication system according to the invention.
Figure 5:
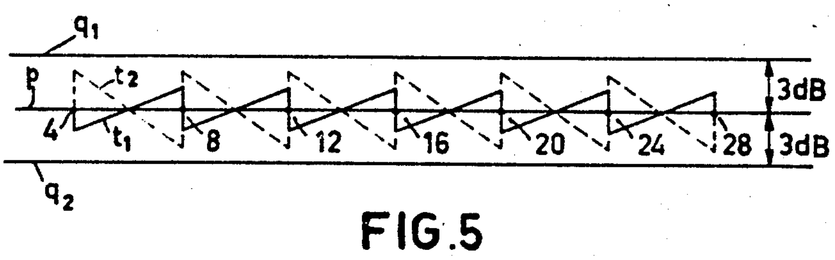
Figure 6:
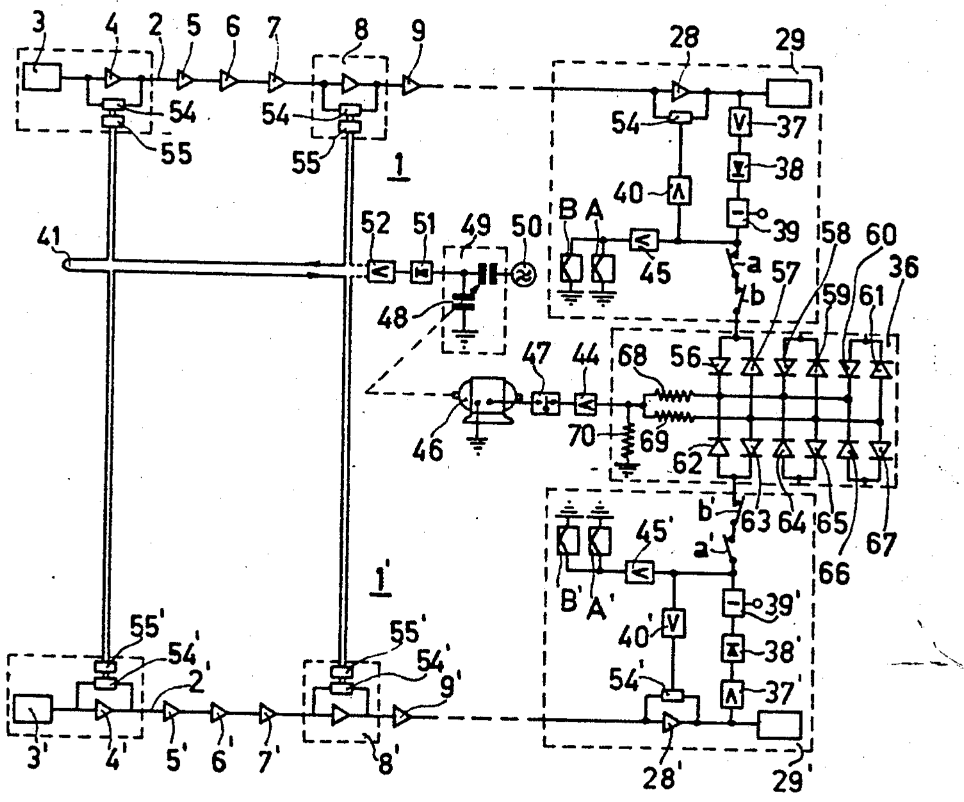

FIGURE 5 an associated level diagram;

FIGURE 6 shows a variant of the communication system according to the invention as shown in FIGURE 4.

Figure 1:
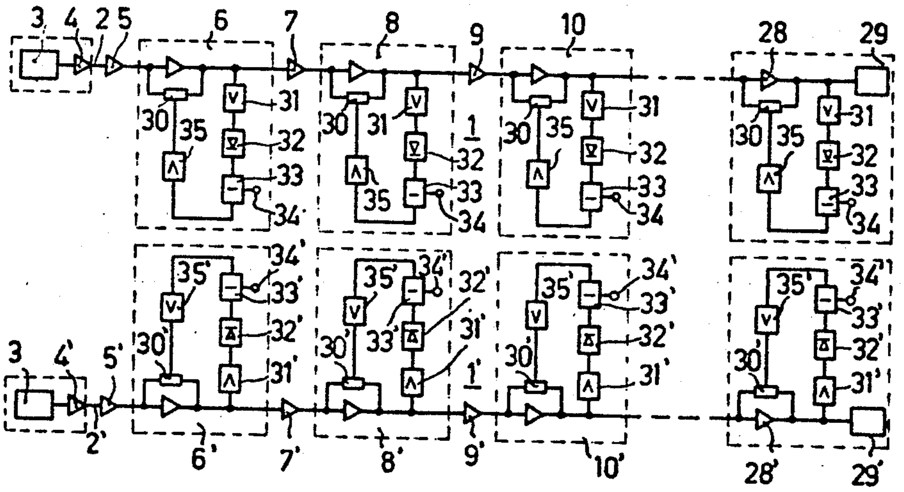

The transistorised carrier telephony system of known type shown in FIGURE 1 serves for the transmission of signals in one direction of traffic through a plurality of coaxial lines within a transmission cable, for example 960 speech signals in the frequency band from 60 kc./s. to 4 mc./s. being transmitted through each coaxial line. In the practical embodiment the carrier telephony system includes six carrier telephone connections for the signal transmission in one direction of traffic, only two such connections, designated 1, 1', being shown for the sake of clarity and their associated coaxial lines being indicated by 2, 2'.

All the carrier telephone connections are similar in structure so that a description of the carrier telephone connection 1 will suffice. Corresponding elements of the carrier telephone connection 1' are indicated by the same reference numerals but provided with an index.

In the carrier telephone connection 1 the carrier telephone signals provided by a first station 3 and an associated first repeater station 4 are applied through intermediate repeater stations 5, 6, 7, 8, 9, 10 . . . 27 to a final station 29 and an associated final repeater station 28. The powering of the intermediate repeater stations 5 to 27, which is not shown, is effected in known manner by means of a direct supply voltage which is applied, for example, from the first station 3, together with the carrier telephone signals, to the coaxial line 2.

To compensate for variations in the level of the transmitted signals, which are caused substantially by damping variations in the coaxial line 2 resulting from variations in temperature, each of the intermediate repeater stations 6, 8, 10 . . . and the final repeater station 28 include a level-control device constituted by a temperature dependent resistor 30, for example in the form of a thermistor or a small incandescent lamp, included in a negative feedback circuit of each of the repeater stations 6, 8, 10 . . ., a level control current serving for level control being supplied as a heating current to the filament of the said incandescent lamp. The intermediate repeater stations 5, 7, 9 . . . do not include level-control devices.

For the level control of the repeater stations 6, 8, 10 . . . 28 a pilot signal is transmitted, together with the carrier telephone signals, along the coaxial line 2 and applied in each of the repeater stations 6, 8, 10 . . . 28 to a pilot receiver connected to the output of the relevant repeater station for the purpose of producing a level-control signal serving for level control. More particularly the pilot receiver is constituted by the cascade connection of a selective pilot amplifier 31 tuned to the pilot frequency, rectifying device 32 and an amplitude comparison device 33 for comparing the amplitude of the output voltage from the rectifying device 32 with a constant reference voltage originating from a terminal 34, the output voltage of which provides, after amplification in a direct-current amplifier 35, the level control signal.

By control of the negative feedback factor of the repeater stations 6, 8, 10 . . . 28 an accurate level control is thus obtained in the described carrier telephone connection 1. For example, an increase in the level of the pilot signal causes a corresponding increase in the negative feedback factor, resulting in a decrease in amplification which counteracts the increase in level, whereas a decrease in the level of the pilot signal results in an increase in amplification which counteracts the decrease in level.

The operation of the described carrier telephony system will now be explained in detail with reference to the level diagram of FIGURE 2, in which the straight line $p$ indicates the nominal level of the pilot signal and the lines $q_1$, $q_2$ located on both sides of the nominal level of the pilot signal represent the limiting values of the pilot signal level. These limiting values lie, for example, at 3 db from the nominal level $p$ of the pilot signal. The distances between the controlled repeater stations indicated by 6, 8, 10 . . . 28 in FIGURE 1 are chosen to be such that the deviations in pilot signal occurring along the whole coaxial line 2 lie within the two limiting values $q_1$ and $q_2$.

If, in the described carrier telephone connection 1, a variation in the damping of the coaxial line occurs, for example, a reduction of damping caused by a decrease in the temperature of the line, the level of the pilot signal along the carrier telephone connection 1 will increase, resulting in a corresponding increase in the output current of the pilot receivers which, by control of the negative feedback factors of the associated repeater stations 6, 8, 10 . . . 28, restore the output level of these repeater stations substantially to nominal level. For illustrative purposes the line $s_1$ in FIGURE 2 shows the pilot signal upon a decrease in damping resulting from a decrease in the temperature of the line, for example, at a temperature T1 and the broken line $s_2$ shows the pilot signal level upon an increase in the temperature of the line, for example, at a temperature $T_2$. As may be seen from the figure, the level of the pilot signal is in each case restored to nominal level at the repeater stations which include level-control devices.

It is thus ensured that the level of the pilot signal along the whole telephone connection 1 nowhere exceeds the limiting values $q_1$ and $q_2$ due to the cascade connection of the repeater stations 6, 8 . . . 28 including level control, but this cascade connection, on the other hand, results in an unstable output level, occurring in the final station 29 due to the interaction of the control equipments in the various repeater stations 6, 8 . . . 28. In fact, if level control occurs in one of the repeater stations, for example, in repeater station 6, the resulting variation in the level of the pilot signal will bring about a level control through the succeeding pilot receivers in the associated repeater stations 8, 10 . . . 28, which in the final station 29 gives rise to a decay phenomenon the magnitude and duration of which are determined by the number of the repeater stations including level control.

The carrier telephone connection 1' is quite analogous in design and operation to the carrier telephone connection 1 described hereinbefore.

Figure 3:
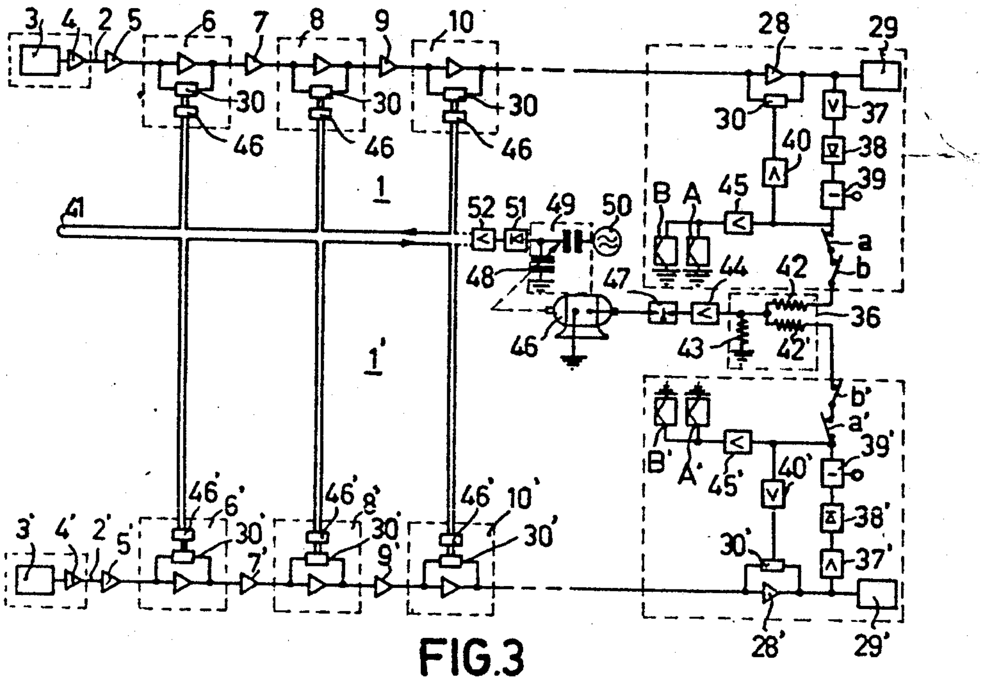
FIGURE 3 shows a communication system according to the invention.

In order to obtain a considerable simplification in structure and equipment, together with a stable output level of the final station 29, the carrier telephone system according to the invention is designed in the manner shown in FIGURE 3. For comparison of the arrangement according to the invention with the known arrangement of FIGURE 1, the various stations are indicated by the same reference numerals in FIGURE 3.

The carrier telephone system according to the invention as shown in FIGURE 3 is distinguished from the known system of FIGURE 1 in that the adjustable level-control impedances in the level control devices of the repeater stations 6, 8, 10 . . . 26; 6', 8', 10' . . . 26' preceding the final stations 29, 29' in the coaxial lines 2, 2' are controlled collectively by the output signal from an averaging device 36, to the input terminals of which the output circuits of pilot receivers included in the coaxial lines 1, 1' at the final stations 29, 29' are connected, whereas the adjustable level-control impedances 30, 30' serving for level control in the final stations 29, 29' are controlled each individually by their associated pilot receivers.

The pilot receivers in the final stations 29, 29' are designed in the usual manner and more particularly include successively selective pilot amplifiers 37, 37' rectifiers 38, 38' amplitude comparison devices 39, 39' and amplifiers 40, 40' the output signals of which are applied on the one hand, for the individual control of the final stations, to the adjustable level-control impedances 30, 30' and on the other hand, for the collective level control of the repeater stations 6, 8, 10 . . . 26; 6', 8', 10' . . . 26' of the two carrier telephone connections 1, 1', to an averaging device 36, still to be described, which provides a signal proportional to the mean value of the output signals from the pilot amplifiers. The collective level control is effected through a separate level control line 41 to which are connected both the adjustable level-control impedances 30 of the repeater stations 6, 8, 10 . . . 26 of the carrier telephone connection 1 and those (30') of the repeater stations 6', 8', 10' . . . 26' of the carrier telephone connection 1'.

The adjustable level-control impedances 30, 30' of the repeater stations 6, 8, 10 . . . 26; 6', 8', 10' . . . 26' in the two carrier telephone connections 1, 1' are controlled in common and in the same manner by the level control signal applied to the level control line 41. For example, if the level control signal increases, an equal decrease in amplification counteracting the said increase in level will occur due to control of the adjustable level-control impedances 30, 30' in the repeater stations 6, 8, 10 . . . 26; 6', 8', 10' . . . 26' of the two carrier telephone connections 1, 1', whereas upon a decrease of the level control signal an equal increase in amplification occurs in the various repeater stations 6, 8, 10 . . . 26; 6', 8', 10' . . . 26' of the two carrier telephone connections 1, 1'. In fact, the applicant has found that the dampings of the two coaxial lines 2, 2' at different temperatures of the cable differ only slightly from each other even for very long carrier telephone connections, for example, over several hundreds of kilometres, so that the collective control, as a function of the mean value of the output signals from the two pilot receivers, in the intermediate repeater stations 6, 8, 10 . . . 26; 6', 8', 10' . . . 26' of the two carrier telephone connections 1, 1' results in an accurate level control. At any rate it is achieved by the collective level control of the intermediate repeater stations 6, 8, 10 . . . 26; 6', 8', 10' . . . 26' that the level of the pilot signal never exceeds the limiting values set therefor along the two carrier telephone connections 1, 1', whilst the output level of the two carrier telephone connections 1, 1' is exactly brought to nominal level by the individual level control in the two final stations 29, 29'. In practice the level diagram of the carrier telephone system described corresponds to FIGURE 2.

In the illustrated embodiment, in order to produce the level control signal required for the collective level control of the intermediate repeater stations, the output signals from the two pilot receivers are applied in the averaging device 36 through equal resistors 42, 42' to a large common resistor 43, the voltage derived from the common resistor 43, which voltage is equal to the mean value of the output voltages of the pilot receivers, being applied to an output amplifier 44 for the collective level control.

If the currents flowing through the resistors 42, 42' are represented by $I_1$ and $I_2$ respectively, the sum of these currents flowing through the common resistor 43, because of the very high value thereof, e.g. several megohms, is substantially equal to zero, or:

$$I_1+I_2=0 \quad \text{(I)}$$

If the output voltages of the pilot receivers are represented by $V_1$ and $V_2$, and if V is the voltage across the common resistor 43, the Equation I may be written as:

$$\frac{V_1-V}{R}+\frac{V_2-V}{R}=0 \quad \text{(II)}$$

where R is the resistivity value of the equal resistors 42, 42', or from this equation it follows directly:

$$V=\frac{V_1+V_2}{2} \quad \text{(III)}$$

Thus, in the specified embodiment, the level control signal required for the collective level control of the repeater stations 6, 8, 10 . . . 26; 6', 8', 10' . . . 26' is obtained, it being readily possible to extend the arrangement to a larger number of carrier telephone connections. For example, when using this arrangement for six carrier telephone connections in the practical carrier telephone system, the voltage across the common resistor 43 is equal to the mean value of the output voltages of the six pilot receivers then employed. The voltage appearing across the common resistor 43 is invariably equal to the mean value of the output voltages from the pilot receivers applied thereto through the equal resistors 42, 42'.

Without objection for the level control it is possible to interrupt the line from a pilot receiver to the averaging device 36. In fact, the magnitude of the collective level-control signal under normal operating conditions will be affected thereby only to a slight extent, whilst the individual level control in the final stations 29, 29' always ensures that the output level is brought to nominal level in each of the carrier telephone connections 1, 1'. In the arrangement according to the invention this property is utilized to obtain an accurate collective level control under any conditions. In fact, if the output voltage of a pilot receiver lies beyond two predetermined limiting values as the result of a defect, the line from the respective pilot receiver to the averaging device 36 is interrupted for this purpose. In the arrangement according to the invention this is achieved in a very simple manner by applying the output voltage of each pilot receiver through amplifiers 45 and 45' respectively to a marginal guard device in the form of a maximum relay and a minimum relay A, B and A', B' having make contacts *a*, *a'* and back contacts *b*, *b'*, respectively, located in the lines from the pilot recievers to the average device 36. It will be evident that the marginal guard device may be designed, instead of with electro-mechanical relays, wholly electronically.

With an accurate level control of the various carrier telephone connections 1, 1' while using only a single level control line 41, a considerable saving in equipment is obtained, and more particularly in comparison with the known arrangement of FIGURE 1, in the intermediate repeater stations 6, 8, 10 . . . 26; 6', 8,' 10' . . . 26' including level control the associate pilot receivers are economized and, furthermore, the reliability of operation is improved. If, for example, an interference would occur in one of the carrier telephone connections 1, 1' a reasonable level control is still maintained in the disturbed carrier telephone connection due to the collective level control.

The level control signal for the collective level control may be transmitted through the level control line 41 in various ways, for example, by frequency modulation, pulse modulation or the like, but because of the simplicity in equipment and the comparatively great damping of the level control line 41 with respect to alternating voltages, which is, for example, 1 db per kilometre lentgh for an alternating voltage of 1000 c./s., it is most advantageous to transmit the level control signal as a direct level-control current. In fact, not only is the damping of the line considerably lower, but it is then also achieved that by connecting the adjustable level-control impedances 30, 30' of the repeater stations 6, 8, 10 . . . 26; 6', 8', 10' . . . 26' in series-combination to the level control line 41, these adjustable level-control impedances 30, 30' are controlled substantially in the same manner independently of the properties of the control line 41 since the leakage impedance of the level control line 41 is very high with respect to direct current, for example, 1000 megohms per kilometre.

It is in this case advantageous to supply the direct level-control current to the temperature-dependent level-control impedances 30, 30' instead of directly as a heating current, through direct-current converters 46, 46', since in this arrangement the direct level-control current need provide only the comparatively low control power of the direct-current converters 46, 46'. Not only is thus a considerable saving in power obtained, for example, by a factor of 10, but with the use of the DC converters described in greater detail in the copending patent application Ser. No. 431,642 filed Feb. 10, 1965 by Willem Hermes et al. it is also achieved that the described level control equipment is largely independent of longitudinal currents or voltages which may be induced in the level control line 41 by heavy electric traction engines or stroke of lightning.

With the remarkable simplification in equipment and accurate level control, together with high reliability of operation, an additional important advantage with respect to the known equipment resides in that, in the arrangement according to the invention, unwanted variations in level at the outputs of the final stations 29, 29' resulting from cooperation of the control equipments in the various repeater stations 6, 8, 10 . . . 28, 6', 8', 10' . . . 28' are largely limited since all of the adjustable level-control impedances are controlled from the final stations 29, 29' by the pilot receivers included therein. Unwanted variations in level may in practice even be suppressed completely by making the rate of level control in the final repeater stations 28, 28' considerably higher than that of the intermediate repeater stations 6, 8, 10 . . . 26, 6', 8', 10' . . . 26' so that the level control devices in the final repeater stations 28, 28' can follow the level variations caused in the intermediate repeater stations 6, 8, 10 . . . 26; 6', 8', 10' . . . 26'.

To this end, the direct level-control current for the level control in the intermediate repeater stations 6, 8, 10 . . . 26; 6', 8', 10' . . . 26' is not derived directly from an output amplifier 44 but is rather obtained with the use of a regulating motor 46 which at the same time acts as a memory and is controlled by a control device 47 connected to the output circuit of the amplifier 44 and comprising a maximum relay and a minimum relay as shown diagrammatically in the figure. In fact, if the output voltage of amplifier 44 exceeds a predetermined limiting value, the maximum relay responds and the regulating motor 42 rotates in one direction, whereas if the output voltage of amplifier 44 decreases below a predetermined limiting value, the minimum relay responds and the regulating motor rotates in the other direction. The shaft of the regulating motor 42 is connected to a variable capacitor 48 of an adjustable voltage divider 49 in the output circuit of a local oscillator 50, the alternating voltage derived from the adjustable voltage divider 49, after rectification in a rectifier 51, being applied to an amplifier 52 which provides, through the control line 41, the level control current for the repeater stations 6, 8, 10 . . . 26; 6', 8', 10' . . . 26' for the two carrier telephone connections 1, 1'.

Thus the speed of variation of the control current supplied to the control line, and hence the rate of control of the level control devices in the intermediate repeater stations 6, 8, 10 . . . 26; 6', 8', 10' . . . 26' is reduced considerably so that the level variations in the intermediate repeater stations 6, 8, 10 . . . 26; 6', 8', 10' . . . 26' caused upon level control can be followed by the level-control devices in the final repeater stations 28, 28', so that the variation in pilot signal in the final repeater stations 28, 28' remains constant below 0.1 db. In the described embodiment the rate of control of the stations 6, 8, 10 . . . 26; 6', 8', 10' . . . 26' is, for example, 1 db/min. and that of the final repeater stations 28, 28' is 1 db/sec.

In this connection it should be noted that, instead of through the oscillator 50, the level control current can be derived from a direct-current source and a voltage divider constituted by resistors and connected to the output circuit of the said crackling source, but in this case the risk of crackling contacts is involved. Further, it should be noted that in practical example, which, as previously mentioned, utilized six carrier telephone connections, it is not strictly necessary for all the pilot receivers associated with the final stations of the six carrier telephone connections to be connected to the averaging device, it being already sufficient, for example, to connect four such pilot receivers to the averaging device.

FIGURE 4 shows a modification of the arrangement of FIGURE 3, resulting in a further considerable simplification by the use of the steps indicated in the above mentioned copending patent application for the arrangement according to the invention lends itself especially for use of the steps referred to. Elements corresponding to FIGURE 3 are again indicated by the same reference numerals.

As in the carrier telephone system of FIGURE 3, the repeater stations of the two carrier telephone connections 1, 1' which include level control devices have adjustable level control impedances 54, 54' respectively each included in a negative feedback circuit, those of the repeater stations preceding the final repeater stations 28, 28' being connected in series through DC converters 55, 55' to the level control line 41. Apart from the first repeater stations 4, 4', only the intermediate repeater stations 8, 12, 16, 20, 24; 8', 12', 16', 20', 24' include level control devices connected to the level control line 41, a direct level-control current being supplied to the level control line 41 which causes in the output signals from the repeater stations 4, 8, 12, 16, 20, 24; 4', 8', 12', 16', 20', 24' preceding the final stations 29, 29' a level deviation of opposite polarity with respect to the mean deviations in level of the input signals to the two final stations 29, 29', that is to say in contrast with the arrangement of FIGURE 3, in which the level deviation is compensated in the repeater stations including level control devices, in the arrangement of FIGURE 4 a level deviation is deliberately introduced having an opposite polarity with respect to the level deviation of the incoming signal. The level is brought to its nominal value only in the final repeater stations 28, 28' by the individual level control.

FIGURE 5 shows several level diagrams to illustrate the operation of the described carrier telephony system.

If in this carrier telephony system, when starting from the nominal level, the damping of the coaxial lines 2, 2', decreases due to a decrease in the temperature of the lines, the resulting increase in pilot signal in the pilot receivers of the two final repeater stations 28, 28' will cause an increase in the direct level-control current along the level control line 41 and this increase in direct level-control current will cause through the DC converters 54, 54' in the repeater stations 4, 8 . . . 24; 4', 8' . . . 24' an increase in negative feedback factor such that a level deviation occurs in the output circuits of the repeater stations 4, 8 . . . 24; 4', 8' . . . 24', which is opposite to the increase in level at the inputs of the final stations 28, 28', the level being brought again to its nominal value only in the final stations 28, 28' by the individual level control. Thus, due to the level control used, a decrease in level with respect to the nominal level will occur in the output circuits of the repeater stations 4, 8 . . . 24; 4', 8' . . . 24' preceding the final stations 28, 28' and the level diagram of the described carrier telephony system shows, at the same temperature T of the cable as in the level diagram of FIGURE 2 relating to the known carrier telephone system of FIGURE 1, the variation indicated by the straight line $f_1$ in FIGURE 5, the straight line representing, as in FIGURE 2, the nominal level and the straight lines $q_1$, $q_2$ representing the limiting values of the pilot signal which must not be exceeded.

Figure 2:
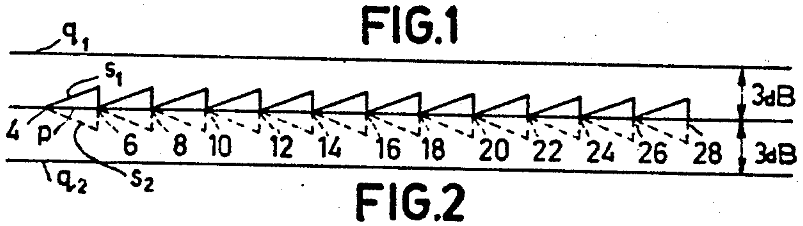

FIGURE 5 also shows, in broken line $t_2$, the level diagram if, due to an increase in damping resulting from an increase in temperature of the table, the incoming signals of the final stations 29, 29' show an increase in level, for example, as in FIGURE 2, at the temperature $T_2$. In practice, the level deviation occurring in the repeater stations 4, 8, 12 . . . 24; 4', 8', 12' . . . 24' is converted by the level control into a deviation of opposite polarity but of equal value.

Remarkable in comparison with the known arrangement of FIGURE 1 is the particular simplicity and saving in equipment in the described carrier telephony system, which, together with the advantages already referred to herein before makes its use in practice very interesting.

FIGURE 6 shows a modification of the carrier telephony system of FIGURE 5 in which corresponding elements are indicated by the same reference numerals. The arrangement of FIGURE 6 differs from that of FIGURE 5 only in the design of the averaging device 36.

As in the carrier telephony system of FIGURE 5, only two of the six carrier telephone connections, designated 1, 1', are shown in FIGURE 6, but in order to illustrate in detail the averaging device 36 the connections of the output circuits of all of the six pilot receivers to the averaging device are shown. As illustrated in the figure, the output circuits of the six pilot receivers are connected through diodes 56, 57; 58, 59; 60, 61; 62, 63; 64, 65; 66, 67 having opposite pass directions to the ends of two identical resistors 68, 69 connected in series, the diodes having the same pass direction 56, 58, 60, 62, 64, 66 being connected to one end of the series-connected resistors 68, 69 and the diodes having the other pass direction 57, 59, 61, 62, 65, 67 being connected to the other end of the series-connected resistors 68, 69. A very high value resistor 70 is in turn connected to the common point of the series-connected resistors 68, 69 and from the said resistor a voltage is derived, as in the arrangements of the FIGURES 3 and 4, which controls through the amplifier 44 the regulating motor for the collective level control.

By the connection of the output circuits of the pilot receivers through diodes to the ends of the series-connected resistors 68, 69 it is achieved that the highest value of the output voltages of the pilot receivers appears at one end of the series-connected resistors 68, 69 and the lowest value appears at the other end thereof. So while the averaging device 36 in FIGURES 3 and 4 provides an output voltage equal to the mean value of the output voltages from all the pilot receivers connected thereto, the output voltage from the averaging device 36 in FIGURE 6 is given by the mean value of the highest and the lowest of the output voltages from the pilot receivers connected to the averaging device 36. It has been found that the output voltages of the averaging devices in FIGURES 3 and 4 on the one hand, and in FIGURE 6 on the other relatively differ only slightly.

The carrier telephony system of FIGURE 6 is otherwise similar in structure and operation to that already described in detail with reference to FIGURE 5 so that it need not be explained further.

In conclusion, it should be noted that the arrangement according to the invention may be used not only for one-way communication along a plurality of parallel transmission lines, but also for communication in the forward and backward directions. More particularly in this case the repeater stations including level control are collectively controlled in the forward and backward directions in the described manner through the level control line by one averaging device located at the final stations in one direction of traffic, whilst the individual control is effected by a pilot receiver associated with each final station in the forward and backward directions.

What is claimed is:

1. A communication system comprising a plurality of parallel signal transmission lines, each of said lines comprising a plurality of repeater stations including a final repeater station, and means for maintaining the transmission level through said lines within given determined values, said means comprising means for applying pilot signals to the inputs of each of said lines, means for deriving from said final repeater station a plurality of first control signals each having a value determined by the intensity of the pilot signal applied to the respective final repeater station, means for individually varying the amplification of each final repeater station as determined by the intensity of the respective control signal, means for producing a second control signal having a value as determined by the average value of said plurality of first control signals, and means for applying said second control signal to the repeater stations preceding said final stations thereby to collectively control the amplification of said last mentioned repeater stations.

2. A communication system as claimed in claim 1 wherein each of said repeaters comprises a variable impedance means for varying the amplification thereof, wherein the variable impedance means of said repeater stations preceding said final stations are connected in series circuit arrangement, and wherein said second control signal is applied to said series circuit arrangement.

3. A communication system as claimed in claim 2 wherein said variable impedance means comprises an element having a value as determined by the intensity of a direct current applied thereto, and wherein said second control signal producing means comprises means for producing a direct current having a value as determined by the average value of said plurality of first control signals.

4. A communication system as claimed in claim 1 wherein said second control signal producing means comprises means for producing a voltage having a value as determined by the average value of the said plurality of first control signals, threshold means actuated to a first and second condition as determined by values of said voltage above a first given level, motor means rotating in one direction upon actuation of said threshold means to the first condition, and rotating in the opposite direction upon actuation of said threshold means to the second condition, said motor being quiescent for values of said voltage between said first and second given levels, means for producing a direct current having a value as determined by the rotational position of said motor means, and means for applying said direct current to said repeater stations preceding said final stations to collectively control the amplification thereof.

5. A communication system as claimed in claim 4 wherein said means for producing a direct current, comprises oscillator means, an adjustable voltage divider comprising a variable capacitor coupled to said oscillator, means comprising said motor means for varying the value of said capacitor thereby to produce an output voltage as determined by the rotational position of said motor, and means for rectifying said output voltage.

6. A communication system as claimed in claim 1 wherein said means for producing said second control signal comprises a resistor network comprising a plurality of identical first resistors having one end connected in common and their other end connected to the pilot signal deriving means of the respective final repeater stations, a second resistor connected between the common end of said first resistors and a point of reference potential, and means for deriving said second control signal from the said common connection.

7. A communication system as claimed in claim 1 wherein said means for producing said second control signal comprises a plurality of pairs of diodes each pair comprising a first and a second diode wherein the anode end of said first diode and the cathode end of said second diode are connected to a respective one of said plurality first control signal deriving means, a first resistor element having one end connected in common to the cathode end of said first diodes, a second resistor element having one end connected in common to the anode end of said second diodes, a third resistor connected between the other end of said first and second resistors and a point of reference potential, and means for deriving said second control signal from the common junction of said resistors.

8. A communication system as claimed in claim 1 further comprising means responsive to the amplitude of a pilot signal in a given final repeater station for disconnecting a respective first control signal from said averaging means at values of said first control signal beyond a given signal range.

9. In a signal transmission system of the type including a plurality of transmitting stations interconnected with a plurality of separate final stations by way of separate parallel transmission lines, wherein each said transmission line includes at least one intermediate repeater station having adjustable level control means for controlling the amplification of signals in the respective repeater station, wherein said transmitting stations include means for applying pilot singals to their respective transmission lines, and wherein said final stations each include adjustable level control means for controlling the amplification of the respective final stations, and pilot receiver means for producing a first control signal responsive to the amplitude of the pilot signals from the respective transmitting station; the improvement comprising averaging means, means applying said first control signals to said averaging means for producing a second control signal that is the average of at least two of said first control signals, means applying said second control signal to said level control means of the repeater stations of each of said lines, and means applying each first control signal to the level control means of the respective final station.

10. The signal transmission system of claim 9 wherein said averaging means comprises first resistor means, and said means applying said first control signals to said averaging means comprises second resistor means connected to apply each first control signal to said second resistor means, whereby said second control signal is the average of all of said first control signals.

11. The signal transmission system of claim 9 wherein said averaging means comprises a first resistor having one end connected to a point of constant potential, and second and third resistors each having one end connected to the other end of said first resistor, and said means applying each of said first control signals to said averaging means comprises first and second diode means connected to apply said first control voltage to the other ends of said second and third resistors with opposite conductivity, whereby said second control signal is the average of the highest and lowest first control signals.

12. The signal transmission system of claim 9 wherein said means for applying said first control signals to said averaging means comprises guard means for inhibiting application of the respective first control signal to said averaging means when said respective first control signal exceeds a predetermined level.

References Cited

UNITED STATES PATENTS 2,102,138 12/1937 Strieby -------------- 333—16

FOREIGN PATENTS 1,144,773 3/1963 Germany.

KATHLEEN H. CLAFFY, *Primary Examiner.*

R. LINN, *Assistant Examiner.*